United States Patent [19]

Enos et al.

[11] Patent Number: 4,820,121

[45] Date of Patent: Apr. 11, 1989

[54] TURBINE HAVING A BEARING CARTRIDGE

[75] Inventors: Anthony Enos, Revere; Robert Gauthier, Reading, both of Mass.

[73] Assignee: Barbour Stockwell, Co., Cambridge, Mass.

[21] Appl. No.: 219,908

[22] Filed: Jul. 18, 1988

Related U.S. Application Data

[63] Continuation of Ser. No. 937,964, Dec. 4, 1986, abandoned.

[51] Int. Cl.[4] .............................................. F01D 9/02
[52] U.S. Cl. .................................. 415/202; 415/DIG. 3
[58] Field of Search ................... 415/16, 30, 118, 201, 415/202, 211, 503, DIG. 3; 416/198 A

[56] References Cited

U.S. PATENT DOCUMENTS

| 578,759 | 3/1897 | McElroy | 415/202 |
|---|---|---|---|
| 1,973,509 | 9/1934 | Santarsiero | 415/202 |
| 2,084,667 | 6/1937 | Bell | 415/202 |
| 2,323,725 | 7/1943 | O'Brien | 415/503 |
| 2,608,807 | 9/1952 | Nilsen et al. | 415/202 |
| 2,769,611 | 11/1956 | Schwarzkopf | 416/198 A |
| 3,324,553 | 6/1967 | Borden | 415/503 |
| 3,325,899 | 6/1967 | Staunt | 415/503 |
| 3,469,318 | 9/1969 | Saffir | 415/503 |
| 3,589,828 | 6/1971 | Mosimann | 415/202 |
| 4,056,748 | 11/1977 | Cross, Jr. et al. | 415/30 |
| 4,435,121 | 3/1984 | Wosika | 415/202 |
| 4,509,900 | 4/1985 | Odawara | 416/198 A |
| 4,604,029 | 8/1986 | Fink | 415/202 |

FOREIGN PATENT DOCUMENTS 219655 10/1924 United Kingdom ............ 416/198 A

Primary Examiner—Robert E. Garrett
Assistant Examiner—John T. Kwon
Attorney, Agent, or Firm—Hamilton, Brook, Smith & Reynolds

[57] ABSTRACT

A high speed turbine includes a bearing cartridge which may easily be replaced with another cartridge capable of delivering different torque capacities and/or speeds of revolution of a rotor assembly. The rotor assembly comprises a rotor disc secured to a rotor shaft, and is supported by bearing within the cartridge.

12 Claims, 3 Drawing Sheets

TURBINE HAVING A BEARING CARTRIDGE

This is a continuation of co-pending application Ser. No. 06/937,964 filed on Dec. 4, 1986, now abandoned.

DESCRIPTION

BACKGROUND OF THE INVENTION

Turbines have established a wide usefulness as prime movers, and are manufactured in many different forms and arrangements. They are used to drive many different types of apparatuses, e.g., electric generators, pumps, and compressors. Turbines have also been used in high speed spin test system for the testing of critical components used in rotating machinery.

A typical design of a turbine comprises a stationary set of blades, often called nozzles or stationary air foil vane, and a moving set adjacent thereto, called rotor buckets, or rotor blades. These stationary and rotating blades act together to direct steam or pressurized air to do work on the rotor. The work can be transmitted to a load through the shaft or spindle on which the rotor assembly is carried. Thus, the only parts that rub and wear are the bearings which support the rotor blades.

In a typical impulse turbines, the annulus following the nozzle exit is filled with steam or air flowing with a high velocity tangent to the rotor. The entire pressure drop is taken across the stationary air foil vanes.

DISCLOSURE OF THE INVENTION

In accordance with the present invention, a turbine driven by pressurized fluid such as air or steam has a removable bearing cartridge. One of the advantages of having a turbine in which the bearing cartridge can be replaced is that when a different cartridge is inserted into the turbine, different torque capacities and/or speeds are possible. Thus the present invention differs from conventional turbines, which are designed as a single unit for performing a singular task, by being capable of handling various tasks by inserting different bearing cartridges. Further, worn parts can be readily replaced without replacing the entire turbine.

In the present invention, the cartridge is fitted to an air box which receives and exhausts the pressurized air or steam. Fitted to the removable bearing cartridge is a rotor assembly and a nozzle plate. Preferably, the rotor assembly comprises a rotor disc secured to a rotor shaft, which is supported by bearings housed within the cartridge. The nozzle plate which surrounds the rotor disc has a plurality of stationary air foil vanes for directing pressurized air or steam received by the air box to rotor buckets along the perimeter of the rotor disc. The rotor buckets capture the pressurized air or steam to cause the rotor assembly to spin and produce work. A second set of rotor buckets is also formed on the rotor disc to capture pressurized air or steam from an opposite direction to brake or reverse the spin of the rotor assembly.

Thus, the present invention enables different bearing cartridges, nozzle plates, rotor shafts, and rotor discs to be assembled in various combinations to meet a wide variety of speeds, torques, and operating conditions within a common casing or air box.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
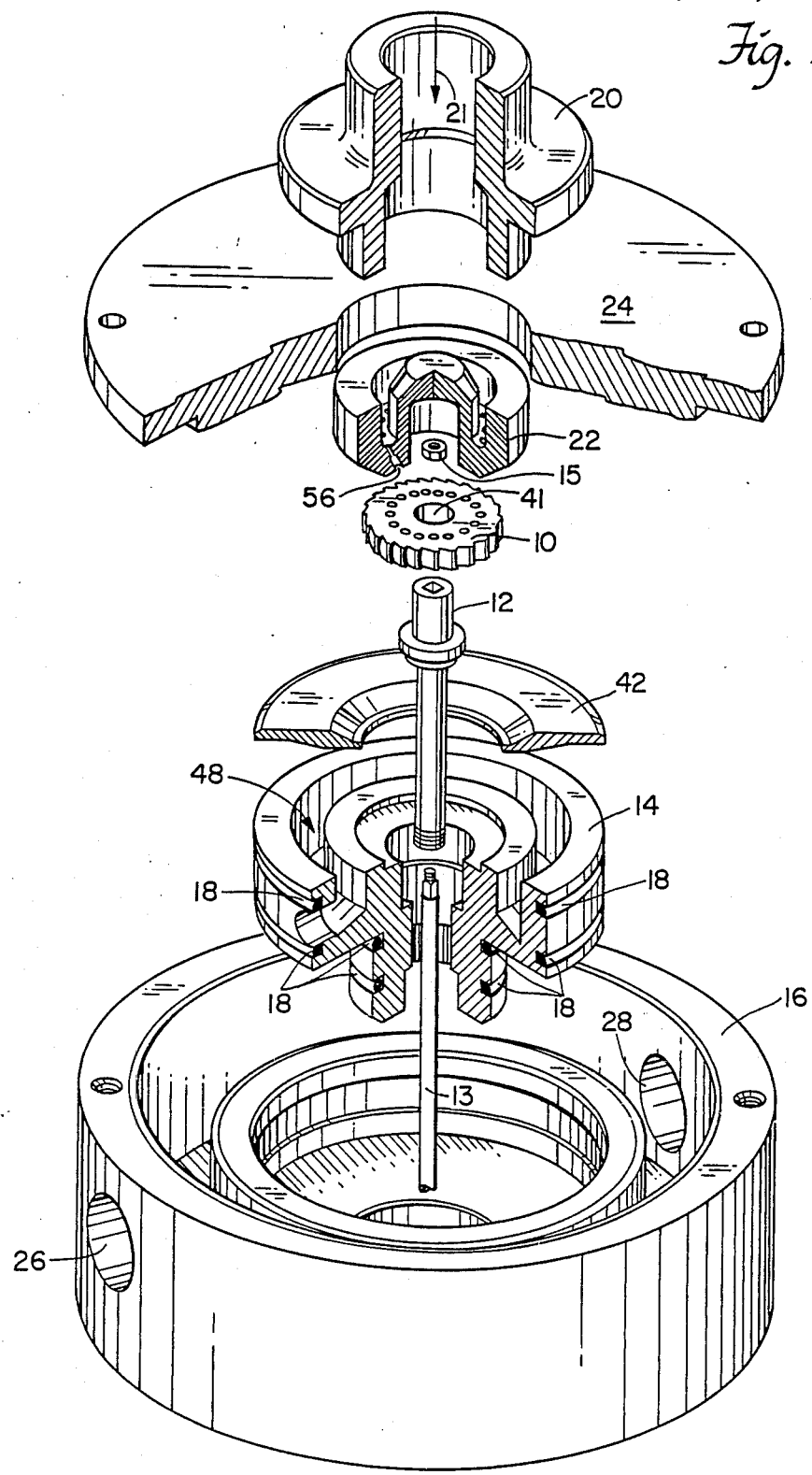
FIG. 1 is an exploded perspective view of a turbine embodying the present invention.

An exploded perspective view of a high speed turbine is shown in FIG. 1. As shown, a rotor assembly comprising a rotor disc 10 and a rotor shaft 12 is displaced within a bearing cartridge 14. Suspended within the rotor shaft is a spindle 13 which is secured to the rotor assembly by a nut 15. The bearing cartridge 14 with the rotor assembly is then fitted to an air box 16. A tight seal is formed between the bearing cartridge and the air box by O-rings 18. When assembled, a cap 20 is secured to a brake assembly 22, and a cover 24 is secured to the top of the air box 16. An inlet 26 and an exhaust port 28 are located to the sides of the air box 16 for supplying and exhausting highly pressurized fluid such as air or steam. Similarly, pressurized air or steam may be supplied through a channel 21, as will be discussed below.

Figure 2:
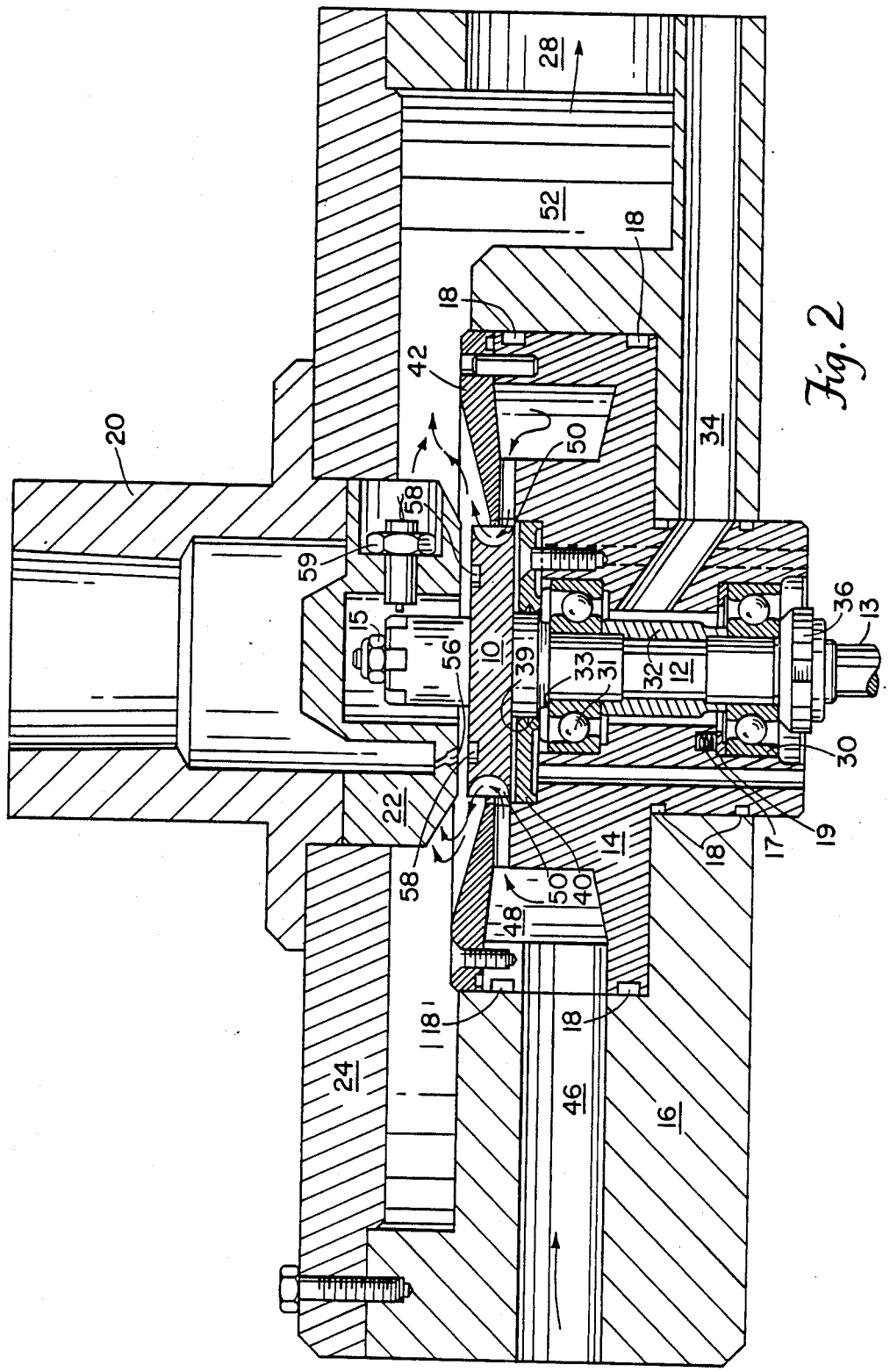
FIG. 2 is a cross sectional view of the turbine embodied in FIG. 1.

The cross section of the turbine, shown in FIG. 2, shows a pair of concentrically aligned bearings 30 and 31 located within the bearing cartridge 14. These bearings 30 and 31 are separated by a bearing spacer 32. The actual size of the bearings housed by the cartridge may vary according to the diameter size of the rotor shaft as will be discussed below. To prevent wear, the bearings 30 and 31 are lubricated by an oil mist which passes through a lubrication channel 34 in the air box 16 and the bearing cartridge 14. Fitted within the two bearings is the rotor shaft 12 of the rotor assembly. The rotor shaft 12 is coupled to the bearings 30 and 31 by a rotor locknut 36 which, when tightened, locks the bearings 30 and 31 between a shoulder 33 of the rotor shaft 12 and the locknut 36. Springs (typically 3 or more) 17 and a washer 19 preloads the bearings 30 and 31 by creating an axial or thrust load. The rotor disc 10, secured to the rotor shaft 12, is separated from the bearings 30 by a labyrinth seal 39 in a plate 40.

In conventional turbines, the rotor disc and the rotor shaft are machined from a solid piece of metal. The problem with this method is that if the rotor disc or rotor shaft should break from fatigue or for whatever reason, the whole unit must be replaced. In the present invention, it is preferred that the rotor disc 10 is secured to the rotor shaft 12 by shrink fitting the rotor disc 10 onto the shaft 12. In other words, before the rotor disc 10 is fitted to the rotor shaft 12, it is heated, causing it to expand. While the rotor disc 10 is hot, the rotor shaft is then fitted through a center hole 41 of the rotor disc 10 (shown in FIG. 1). As the rotor disc 10 cools, it shrinks to fit securely around the rotor shaft 12. Other methods of securing the rotor disc 10 to the rotor shaft 12 such as fitting a key to opposing slots in both the rotor disc and the shaft are also possible. Thus, with the present invention, the rotor disc 10 or rotor shaft 12 may easily be replaced without replacing the whole rotor assembly, thereby minimizing replacement costs.

Figure 3:
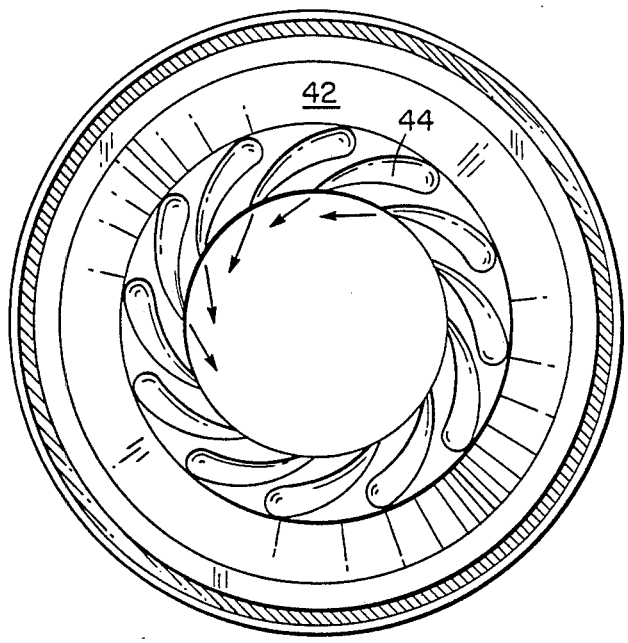
FIG. 3 is a bottom view of a nozzle plate.

Mounted to the top of the bearing cartridge is a nozzle plate 42. Preferably, a plurality of evenly spaced air foil vanes 44, located along the bottom of the nozzle plate 42 as shown in FIG. 3, is used to direct steam or pressurized air to the rotor disc 10. As shown, it is preferred that each of the stationary air foil vanes 44 is shaped like an involuted tear. An advantage of the involuted tear-like shape of the air foil vanes 44 is that it maximizes the force created by pressure of air passing through the nozzle by restricting the flow of air at the smaller end of the nozzle. The nozzle also provides a tangential force, as shown by arrows, to the perimeter of the rotor disc 10 causing it to spin. Other nozzle shapes, however, are possible.

Figure 4:
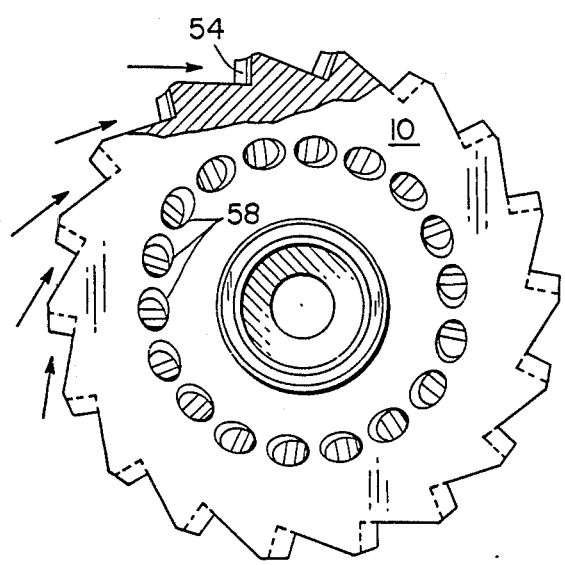
FIG. 4 is a top view of a rotor head, partially broken away.

During operation, pressurized air is forced through the turbine as shown by the arrows in FIG. 2. Pressurized air entering the air box 16 passes through a channel 46 to a plenum 48 located within the bearing cartridge 14. From the plenum 48, the air is fed through the stationary air foil vanes 44 and driven against rotor buckets 50 located along the perimeter of the rotor disc 10 causing the rotor assembly to spin. As the rotor assembly spins, the air driving the rotor assembly is then vented to the exhaust port 28 through an exhaust chamber 52. Preferably, there are fourteen buckets uniformly located along the perimeter of the rotor disc 10 with arced walls 54 perpendicular to the direction of the pressurized air exiting the stationary air foil vanes 44 as illustrated by arrows shown in FIGS. 3 and 4. A silencer (not shown) may be attached to the exhaust port of the air box to reduce the sound generated by the exhausted air.

When it is necessary to quickly slow, stop or even reverse the direction of the spin of the rotor assembly, pressurized air may be directed through multiple orifices or braking nozzles 56 in the braking assembly 22 to a second set of rotor buckets 58 formed on the top of the rotor disc 10. Again, it is preferred that there be fourteen uniformly spaced rotor buckets having arced walls tangent to this directed pressurized air. The pressurized air captured by the second set of rotor buckets 58 is then released to the exhaust chamber 52 as more pressurized air is introduced to the rotor buckets 58. To determine the speed of the rotor assembly, a speed pickup mechanism 59 such as a magnetic pickup is placed in the braking assembly 22.

When constructing the turbine in accordance with the present invention, different sized rotor discs and/or rotor shafts can be used with the same air box. By removing the bearing cartridge, a different sized rotor assembly having a larger or smaller rotor disc may be fitted to the bearings housed within the cartridge. For example, if a turbine having a higher revolution speed is required, a smaller rotor disc secured to the rotor shaft can be fitted to the bearings 30 within the present cartridge 14. Changing the size of the rotor disc, however, may require the nozzle plate 42 to have a larger or smaller inner diameter to fit adjacent to the rotor disc for maximizing the direction and pressure of the pressurized air flowing through the stationary air foil vanes to the rotor buckets. If a larger diameter spindle is required for handling a larger developed torque, then a bearing cartridge with larger sized bearings for accommodating a larger rotor shaft, which may be required, can be used. Alternatively, larger sized bearings may be fitted to a bearing cartridge capable of housing various sizes. Therefore, when different jobs require different speeds or torques, a bearing cartridge containing the required sized rotor assembly can be inserted into a standardized air box, rather than replacing the entire turbine, as would be required when employing conventional turbines. Thus, the present invention provides for a high speed turbine, which includes a bearing cartridge which may easily be replaced with another cartridge capable of delivering different torque capacities and/or speeds of revolution of the rotor assembly supported by the cartridge. The present invention also provides the advantage of minimizing inventory costs by making available parts for multiple applications. Reducing repair costs is also an important advantage.

While the invention has been particularly shown and described with reference to a preferred embodiment thereof, it will be understood by those skilled in the art, that various changes in form and detail may be made therein without departing from the spirit and scope of the invention as defined by the appended claims. For example, the number of rotor buckets located along the perimeter or on top of the rotor disc may vary according to design choice.

We claim:

1. A high speed turbine comprising:
   an air box having an inlet for receiving pressurized fluid and an exhaust for exhausting the fluid;
   a removable bearing cartridge including a rotor shaft positioned by bearings within a stationary portion which fits within the air box, the rotor shaft extending axially beyond the bearings to receive a rotor disc thereon;
   a rotor disc which is supported on the rotor shaft of the bearing cartridge and positioned to receive the pressurized fluid from the inlet of the air box causing it to spin and perform work; and
   a nozzle plate mounted to an end face of the stationary portion of the bearing cartridge for directing pressurized fluid from the inlet to the rotor disc;
   the bearing cartridge being removeable with the rotor disc and nozzle plate and the cartridge, rotor disc and nozzle plate being coupled to each other such that different bearing cartridges and rotor discs and nozzle plates of different diameters are selectively mountable within the air box.

2. A high speed turbine as claimed in claim 1 wherein the rotor disc is shrink-fitted to the rotor shaft.

3. A high speed turbine as claimed in claim 2 wherein the rotor disc has a set of uniformly spaced buckets along the perimeter of the rotor disc to capture the pressurized fluid used to spin the rotor means for performing work.

4. A high speed turbine as claimed in claim 3 wherein the rotor disc has a second set of buckets which are driven by pressurized fluid for braking of reversing the spin of the rotor means.

5. A high speed turbine as claimed in claim 3 wherein the pressurized fluid from the inlet of the air box is directed by involuted tear-like shaped air foil vanes to the buckets.

6. A high speed turbine as claimed in claim 5 wherein the buckets have an arced surface perpendicular to the force of the pressurized air or steam directed from the air foil vanes.

7. A high speed turbine as claimed in claim 1 further comprising means for determining the speed of rotation of the rotor disc.

8. A turbine comprising:

an air box having an inlet means for receiving highly pressurized fluid and an outlet means for exhausting the fluid;

a removable bearing cartridge which fits within the air box, the cartridge having a rotor positioned by bearings within a stationary portion and removable stationary air foil vanes in a nozzle plate and in the path of the highly pressurized fluid for directing the path of the pressurized fluid; and a rotor disc supported by the rotor for receiving pressurized fluid directed from the air foil vanes thereby causing the rotor disc to spin;

the bearing cartridge being removable with the rotor disc and nozzle plate and the cartridge, rotor disc and nozzle plate being coupled to each other such that different bearing cartridges and rotor discs and nozzle plates of different diameters are selectively mountable within the air box.

9. A turbine as claimed in claim 8 wherein the rotor disc has a set of buckets having an arced wall perpendicular to the path of the directed pressurized fluid from the air foil vanes.

10. A turbine as claimed in claim 8 wherein the rotor disc is shrink-fitted to the rotor of the bearing cartridge.

11. A turbine as claimed in claim 8 further comprising a second set of buckets for receiving pressurized fluid for braking or reducing the speed of rotation of the rotor disc.

12. A turbine as claimed in claim 8 further comprising means for determining the speed of rotation of the rotor disc.

* * * * *